United States Patent [19]

Porter

[11] Patent Number: 6,163,811

[45] Date of Patent: Dec. 19, 2000

[54] TOKEN BASED SOURCE FILE COMPRESSION/DECOMPRESSION AND ITS APPLICATION

[75] Inventor: Swain W. Porter, NE Kirkland, Wash.

[73] Assignee: Wildseed, Limited, Kirkland, Wash.

[21] Appl. No.: 09/177,444

[22] Filed: Oct. 21, 1998

[51] Int. Cl.[7] .............................. G06F 15/16; G06F 7/00; G06F 13/38

[52] U.S. Cl. ............................ 709/247; 707/101; 710/68

[58] Field of Search .................................. 709/246–247; 710/68; 707/101, 540, 203, 511

[56] References Cited

U.S. PATENT DOCUMENTS

| | | | |
|---|---|---|---|
| 4,386,416 | 5/1983 | Giltner et al. | 710/68 |
| 4,558,413 | 12/1985 | Schmidt et al. | 707/203 |
| 4,912,637 | 3/1990 | Sheedy et al. | 707/203 |
| 5,357,631 | 10/1994 | Howell et al. | 707/203 |
| 5,495,610 | 2/1996 | Shing et al. | 709/221 |
| 5,530,645 | 6/1996 | Chu | 707/532 |
| 5,574,906 | 11/1996 | Morris | 707/201 |
| 5,715,454 | 2/1998 | Smith | 7070/203 |
| 5,761,499 | 6/1998 | Sonderegger | 707/10 |
| 5,813,017 | 9/1998 | Morris | 707/204 |
| 5,832,520 | 11/1998 | Miller | 707/203 |
| 5,845,077 | 12/1998 | Fawcett | 707/221 |
| 5,884,014 | 3/1999 | Huttenlocher et al. | 358/1.15 |
| 5,903,897 | 5/1999 | Carrier, III et al. | 707/203 |
| 5,905,896 | 5/1999 | Delannoy | 395/712 |
| 5,991,713 | 11/1999 | Unger et al. | 704/9 |
| 5,999,949 | 12/1999 | Crandall | 707/532 |
| 6,011,905 | 1/2000 | Huttenlocher et al. | 358/1.15 |
| 6,012,063 | 1/2000 | Bodnar | 707/101 |
| 6,018,747 | 1/2000 | Burns et al. | 707/203 |

OTHER PUBLICATIONS

Cormen et al., Introduction to Algorithms, The MIT Press, pp. 337–343, 1990.

Pocket Soft, Inc., White Paper re .RTPatch Professional Binary Update System, http://www.pocketsoft.com, pp. 1–12, Nov. 1996.

"Comparing and Merging Files," from the World WIde Web, pp. 1–44, Jun. 1996.

Zeller et al, Unified versioning through feature logic, ACM Trans. SW Eng. & Methd. vol. 6, No. 4, pp 398–441, Oct. 1997.

Hoel et al, "Versioned software architecture", ISA ACM, pp 73–76, Mar. 1998.

Cohen et al, "Version management in Gypsy", ACM pp 201–215, 1988.

Black, A., et al., "A Compact Representation for File Versions: a Preliminary Report," Proc. 5th Int'l. Conf. On Data Engineering, 1989, IEEE, pp. 321–329, Feb. 1989.

Bell, T., et al., "Modeling for Text Compression," ACM Computer Surveys, vol. 21, No. 4, pp. 557–591, Feb. 1989.

*Primary Examiner*—Zarni Maung
*Assistant Examiner*—Andrew Caldwell
*Attorney, Agent, or Firm*—Columbia IP Law Group, LLC

[57] ABSTRACT

Disclosed is a software distribution system using both differencing and compression techniques to distribute source files over a network while minimizing the network bandwidth needed to maintain and update a set of source files. In an embodiment, a sending computer maintains sets of source files in base and delta form. The delta source files contain difference information allowing a new version of a source file to be constructed, or reconstituted, from a previously reconstituted version. Prior to transmitting a source file in either base or delta form to a receiving computer, the sending computer compresses the source file using a dictionary-based compression scheme. The resulting tokenized source file is stored and then transmitted to the receiving computer along with versioning control information. The receiving computer stores the tokenized source file along with the versioning control information. Upon request, the receiving computer decompresses the tokenized source file(s) and then reconstitutes an updated version of the source using the versioning control information and received decompressed source file(s). In another embodiment, the sending computer provides provides source updates for multiple software vendors. In this case, the versioning control information also identifies the base/delta source files using a universally unique identifier (UUID) that distinguishes between the base/delta source files of the different vendors.

22 Claims, 8 Drawing Sheets

TOKEN BASED SOURCE FILE COMPRESSION/DECOMPRESSION AND ITS APPLICATION

BACKGROUND OF THE INVENTION

1. Field of the Invention

The present invention relates to the field of computer systems. More specifically, the present invention relates to methods and apparatuses associated with the distribution or provision of source files to other computer systems.

2. Background Information

With the recent advances in microprocessor, telecommunication and networking technology, increasing number of computer systems are being networked together. In turn, increasing number of situations arise where source files have to be transferred from one computer system to another computer system. The term "source files" as used herein includes but not limited to compilable or interpretable source files written in machine programming languages such as C, C++, HTML, XML, JAVA™, JAVAScript, and so forth. For example, everyday, millions of users are connected to the Internet downloading web pages from a multitude of web sites. Similarly, millions of users are doing the same within thousands of "corporate" intranets. In a new user centric software distribution paradigm, disclosed in co-pending U.S. patent application Ser. No. 09/177,443, filed contemporaneously, and entitled "User centric source control", it is envisioned that software products are distributed to client systems or their proxies in source form. All these activities further exacerbate the well known bandwidth problem confronting private as well as public networks. (Note that the "user centric" approach to source control contributes to the bandwidth problem only in the sense that the approach is expected to increase the demand for source file transmission. For a given set of source files, its delta feature actually reduces bandwidth demand for maintaining and updating the set of source files.)

Various compression/decompression techniques are known in the art in the data or link layer to reduce the amount of data that needs to be transmitted from a sender to a receiver. For examples, a dictionary based approach replacing previously transmitted character string (e.g. "this string has been sent before") with a code is often employed in modem communication; the run length encoding approach (e.g. encoding a series of 10 0-bit as [0, 10]) is often employed in video signal compression, and a code based approach supplying the identity of a linear excitation code vector is often employed in audio compression. However, notwithstanding these multitude of data or link layer compression/decompression techniques available, as evident by the amount of research and development going into Quality of Service, Bandwidth Reservation, Virtual Private Network, and so forth, the problem of bandwidth in private as well as public networks is expected to remain with the computer and communication industry for years to come.

Thus, further improvement or contribution to alleviating the bandwidth problem, in particular, improvement that further advances the connectivity and exchange of information between computer systems, is desired.

SUMMARY OF THE INVENTION

In accordance with the present invention, a source file is provided from one computer system to another in a tokenized form to reduce transmission bandwidth requirement. In the tokenized form, at least language elements present in the source file in its original form are substituted with corresponding tokens. In one embodiment, operands present in the source file in the original form are also substituted with corresponding tokens, and entries mapping the operand substituting tokens to the operands are maintained in a symbol table. In this case, the symbol table is also provided to the other computer system.

In one embodiment, the source file is also in either a base or delta form. A new entry is created for the symbol table whenever a new operand is encountered and substituted. In this case, subsequent to the initial provision of the symbol table, new entries associated with a base/delta source file are also provided to the other computer system to update the previously provided symbol table.

In one embodiment, the base/delta source files also have associated versioning control information. In this case, the versioning control information is also provided to the other computer system.

In one embodiment, the computer system is a web server, and the source file is a web page. The other computer system is a client computer system requesting the web page from the web server. The requested web page is provided by the web server to the client computer system in the tokenized form, and the client computer system is equipped with a browser having been enhanced with the ability to restore the provided web page to its original form. In one embodiment, the web page is also in a base/delta form having associated versioning control information, and the client computer system browser is enhanced with the ability to reconstitute the requested web page using the associated versioning control information.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as tables, files, data and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of a digital system; and the term digital system include general purpose as well as special purpose data processing machines, systems, and the like, that are standalone, adjunct or embedded.

Various operations will be described as multiple discrete steps performed in turn in a manner that is most helpful in understanding the present invention, however, the order of description should not be construed as to imply that these operations are necessarily order dependent, in particular, the order the steps are presented.

Figure 1A:
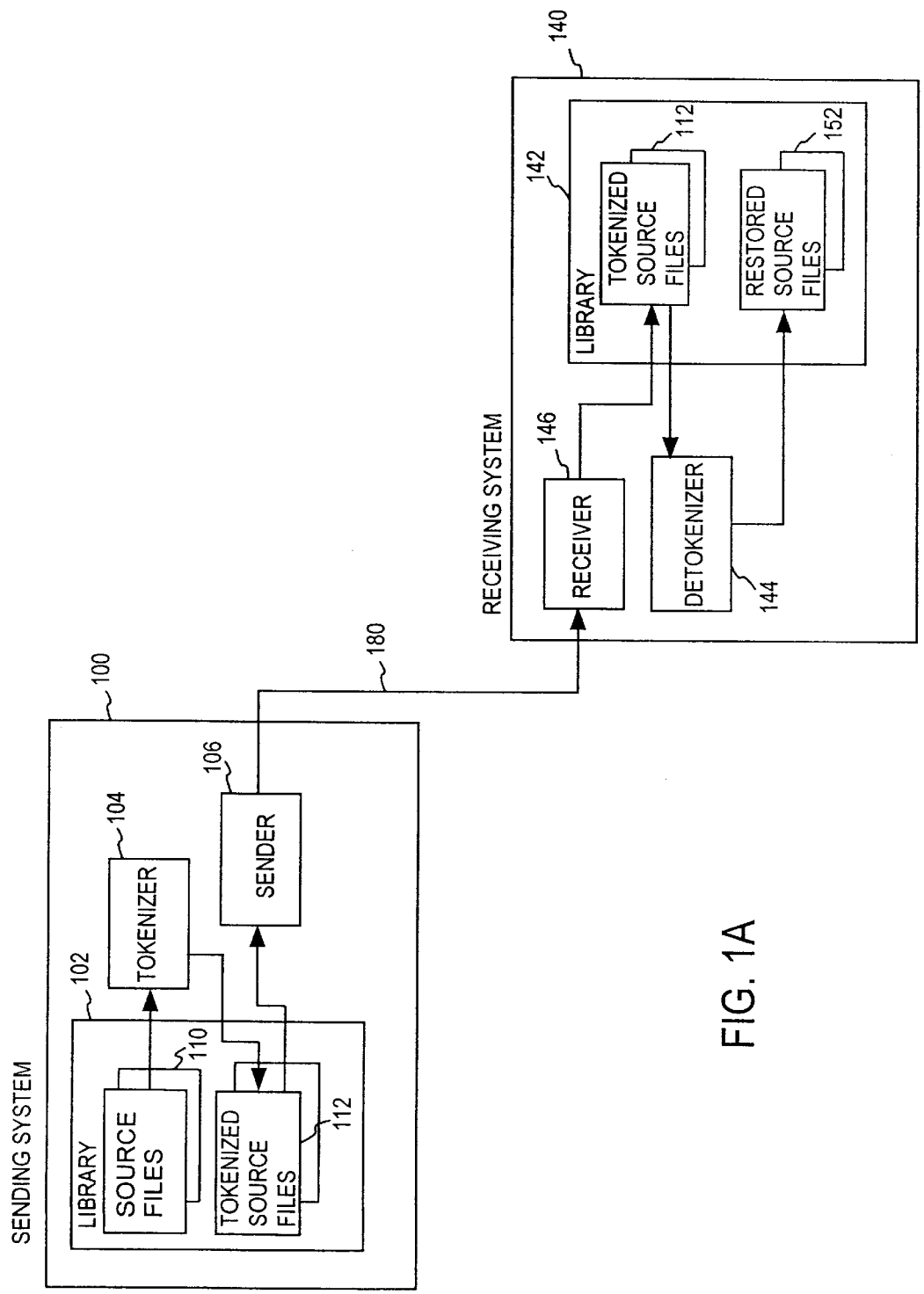
FIGS. 1a–1c illustrate three exemplary embodiments of the token based compressed source file transmission of the present invention.
Figure 1B:
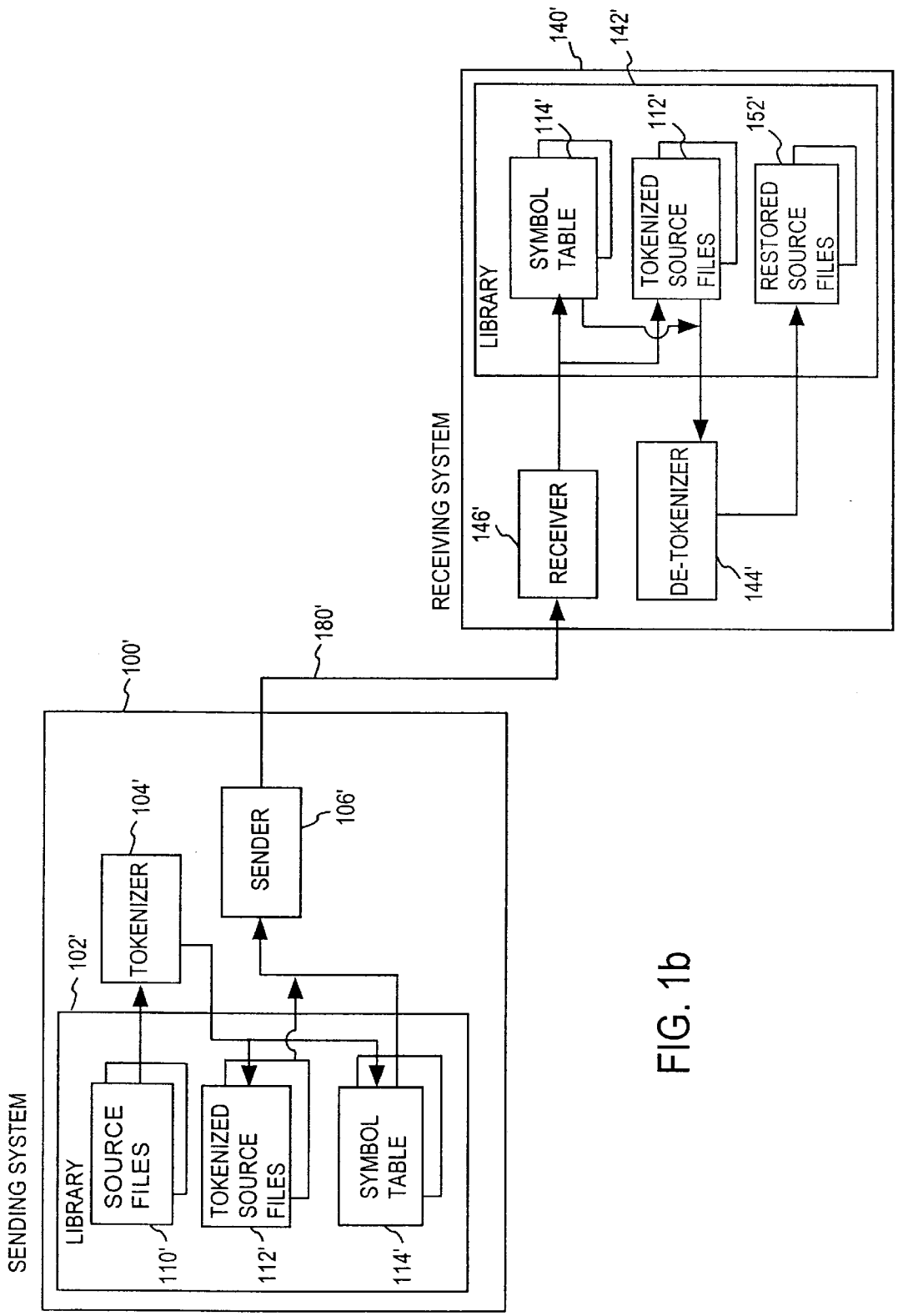
Figure 1C:
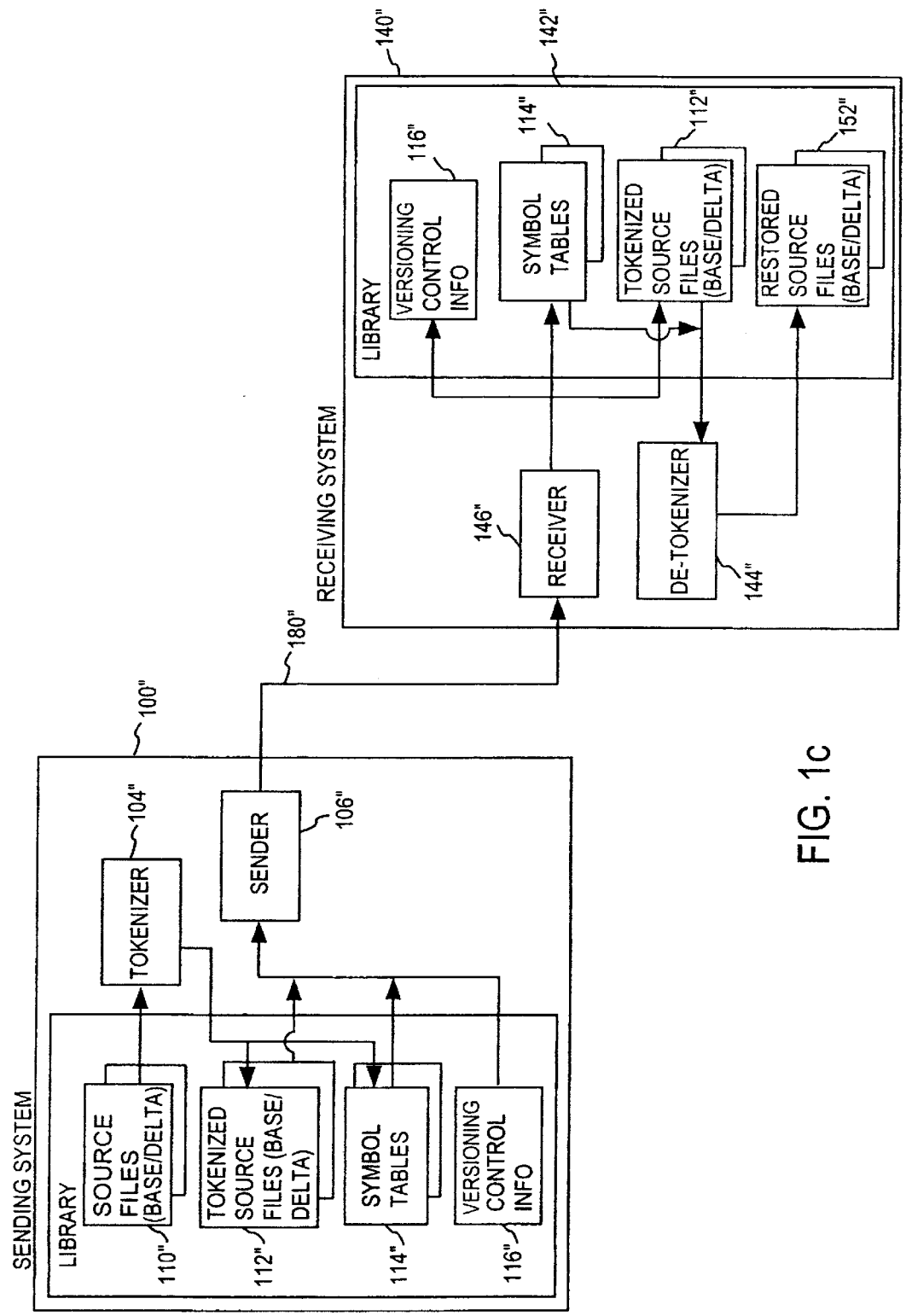
Figures 2A, 2B:
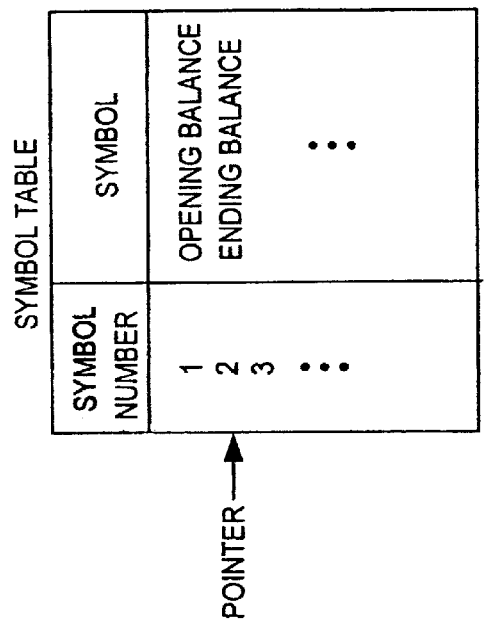
FIGS. 2a–2b illustrate one exemplary embodiment each for a collection of tokens and an associated symbol table suitable for use to practice the present invention.

Referring now to FIGS. 1a–1c, wherein three exemplary embodiments of the present invention are shown. These three exemplary embodiments will be described in turn, referencing also FIGS. 2a–2b. First, referring to FIG. 1a, exemplary sending and receiving systems 100 and 140 are illustrated as being coupled to one another via communication medium 180. More importantly, in accordance with the present invention, sending system 100 advantageously provides source files to receiving system 140 in a tokenized form, generated from an original form, thereby reducing transmission bandwidth requirement on communication medium 180. For the illustrated embodiment, sending system 100 includes library 102, tokenizer 104 and sender 106, whereas receiving system 140 includes library 142, de-tokenizer 144 and receiver 146.

Over in sending system 100, library 102 is used to store source files 110 in the original form and source files 112 in the tokenized form. Tokenizer 104 is used to transform source files 110 in the original form to source file 112 in the tokenized form. For the illustrated embodiment, tokenizer 104 effectuates the transformation by substituting language elements, such as arithmetic operators, relational operators and so forth, with tokens. The term "token" as used herein is intended to have similar meaning as the term is commonly used by those skilled in the art of compiler technology, which typically includes a token class designation, e.g. arithmetic operator, and a class value, which may be a value designating a particular operator of the class, e.g. the value designating the "+" operator (see FIG. 2a, wherein an exemplary collection of language element substituting tokens is illustrated). Sender 106 is used to send source files 112 in the tokenized form to receiving system 140, as described earlier. Sender 106 may send source files 112 in the tokenized form to receiving system 140 at its own initiative, at the request of a local requestor (not shown), e.g. an application, or a remote requestor (also not shown), e.g. an application on receiving system 140.

In one embodiment, the programming language a particular source file 110/112 is written in is inferred from the file name of the source file, e.g. the file name including a file extension, such as "htm" for the hypertext markup language (HTML). In another embodiment, the programming language a particular source file 110/112 is written in is determinable from the properties associated with the particular source file 110/112, which is integrally provided along with a particular source file 112, when the particular source file 112 in tokenized form is provided to receiving system 140. In yet another embodiment, sender 106 informs receiver 146, the programming language the particular source file 110/112 is written in.

Still referring to FIG. 1a, over in receiving system 140, receiver 146 is used to receive source files 112 in the tokenized form from sending system 100, including as described earlier, its programming language, either integrally or particularly. Library 142 is used to store received source files 112 in the tokenized form, as well as restored source files 152 in the original form. De-tokenizer 144 is used to restore source files 112 in the tokenized form to source file 152 in the original form. For the illustrated embodiment, de-tokenizer 144 effectuates the transformation by restoring language element substituting tokens with their corresponding language elements. De-tokenizer 144 is equipped with the language element substituting token to language element mappings for a number of programming languages. In one embodiment, source files 110/112/115 may be written in include but not limited to C, C++, HTML, XML, Java$^{TK}$, and JavaScript, and de-tokenizer 144 is accordingly equipped to handle the supported programming languages.

Communication medium 180 is intended to represent a broad range of communication medium known in the art, from local area networks (ethernet, token ring, etc.) to wide area networks (ATM, frame relay, and so forth). Accordingly, communication medium 180 will not be further described. Libraries 102 and 142, sender/receiver 106 and 146, as well as tokenizer/de-tokenizer 104 and 144 are also intended to represent a broad range of these elements known in the art. Thus, except for the manner these elements are employed to practice the present invention, individually, these elements will also not be further described.

FIG. 1b illustrates an alternate embodiment. In this embodiment, sending system 100' also advantageously provides source files to receiving system 140' in the tokenized form, thereby reducing the bandwidth requirement on communication medium 180'. Sending system 100' similarly includes library 102', tokenizer 104' and sender 106', while receiving system 140' similarly includes library 142', de-tokenizer 144' and receiver 146'. Each of these elements perform the same functions as the corresponding element described earlier for the embodiment of FIG. 1a. The key differences between these two embodiments are in the manner in which tokenizer 104' transforms source files 110' in the original form to source files 112' in the tokenized form, and de-tokenzier 144' restores source files 112' in the tokenized form to source files 115' in the original form.

More specifically, in addition to substituting language elements with corresponding tokens to reduce transmission bandwidth requirement, as described earlier, tokenizer 104' further substitutes operands present in source file 110' in the original form with corresponding tokens. Additionally, tokenizer 104' further creates and maintains a symbol table 114' for each group of related source files, e.g. those to be compiled and linkedited together. In particular, tokenizer 104' creates a mapping entry for symbol table 114' for each new operand it encounters and substitutes with a new token. For the exemplary embodiment of tokens illustrated in FIG. 2a, the class value of the operand class token will be set to a pointer pointing to the appropriate mapping entry in the symbol table (see FIG. 2b, wherein an exemplary embodiment of a symbol table is illustrated).

Symbol tables 114' are also provided to receiving system 140' by sender 106' of sending system 100'. In like manner, receiver 146' stores the received symbol tables 114' in library 142', making them available to de-tokenizer 144' when it restores source files 112' in the tokenized form to source files 152' in the original form. In other words, in addition to the language element substituting token to language mappings de-tokenizer 144' is equipped with, de-tokenizer 144' further uses the operand substituting token to operand mappings in symbol tables 114' to effectuate the restoration.

FIG. 1c illustrates yet another alternate embodiment. In this embodiment, sending system 100" also advantageously provides source files to receiving system 140" in the tokenized form, thereby reducing the bandwidth requirement on communication medium 180". Sending system 100" similarly includes library 102", tokenizer 104" and sender 106", while receiving system 140" similarly includes library 142", de-tokenizer 144" and receiver 146". Each of these elements perform the same functions as the corresponding element described earlier for the embodiments of FIGS. 1a–1b. The key difference between this and the earlier embodiments is the fact that source files 110"/112"/115" are also in either a base or delta form, having associated versioning control information 116". Accordingly, sender 106" also provides receiving system 140" with new operand substituting token to operand mappings for symbol tables 114", whenever sender 106" provides receiving system 140" with a base/delta source file 112" in the tokenized form involving new operand substituting tokens, not previously employed in base/delta source files 112" earlier provided to receiving system 140". Additionally, for this embodiment, sender 106" also provides versioning control information 116" to receiving system 140".

In one embodiment, each of base/delta source files 110"/112"/115" is identified with a universally unique identifier (UUID), as disclosed in co-pending U.S. patent application Ser. No. 09/177,443, filed contemporaneously, entitled "User Centric Source Control", which is hereby fully incorporated by reference (except for the reciprocating incorporation by reference). In other words, sender 106" and receiving system 140" are one each of the vendor and user systems respectively, practicing the "user centric" source distribution method of the copending application, wherein vendor software products are distributed to the user systems in a base and delta source form, along with versioning control information. Each of the UUIDs universally identifies the particular base/delta source file 110"/112"/115" among other base/delta source files of the program product as well as among other base/delta source files of all other program products of all other software vendors. For this embodiment, the versioning control information 116" includes predecessor UUID information and other control information, such as locking and privileges, for the base/delta source files 110"/112"/115", as described in the co-pending application. As described earlier, sender 106" provides these predecessor UUID and other control information to receiving system 140".

Also in like manner, receiver 146" updates symbol tables 114" stored in library 142", whenever it receives new operand substituting token to operand mappings from sending system 100". Receiver 146" also stores versioning control information in library 140", upon receiving them from sending system 100", and making the versioning control information available for use on receiving system 140".

While the present invention is being described with FIG. 1c as an extension of FIG. 1b, those skilled in the art will appreciate that the present invention may also be practiced with FIG. 1a being extended with the additional base/delta and versioning control features of FIG. 1c, but without the additional tokenizing operand feature of FIG. 1b. In fact, those skilled in the art will appreciate that the present invention may be practiced with other additional features, and/or without some of the earlier described features.

Figure 3A:
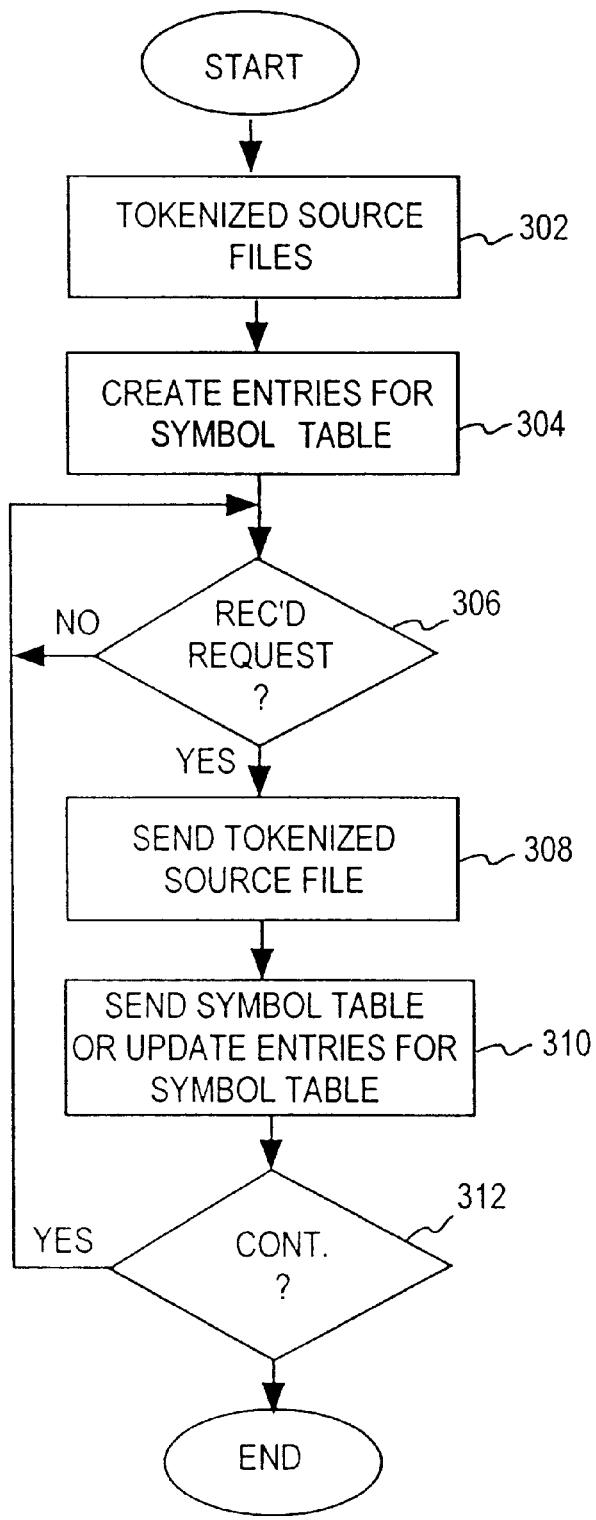
FIGS. 3a–3b illustrate one exemplary embodiment each of the sender and the receiver's method steps in accordance to the present invention.
Figure 3B:
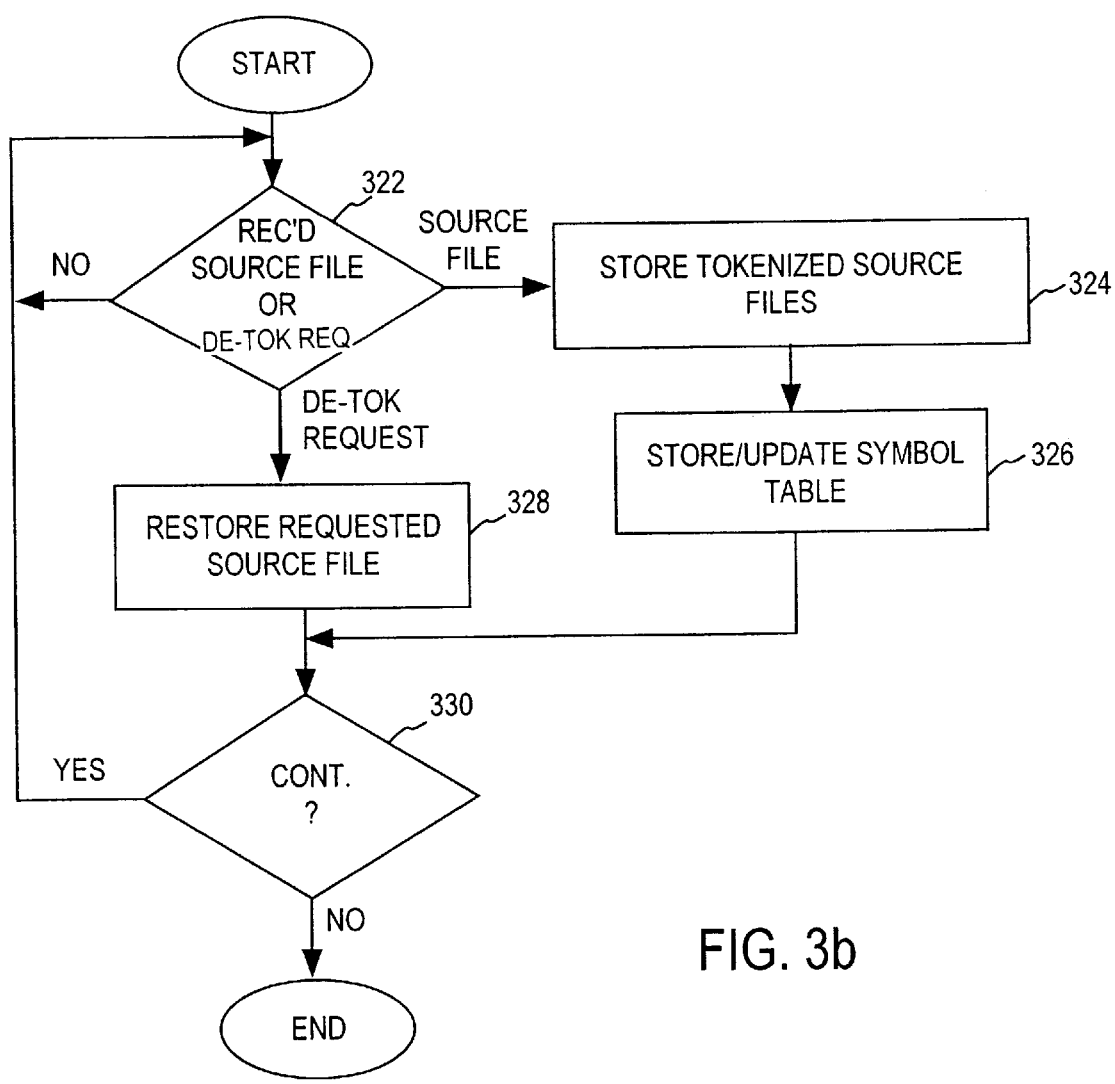

Referring now to FIGS. 3a–3b, wherein one embodiment each of the operational steps of sending and receiving systems 100 and 140 are shown. In the remaining descriptions, when reference is made to an element, such as tokenizer 102, unless specifically noted, the reference is intended to include all embodiments earlier described, i.e. tokenizer 102, 102' as well as 102" of FIG. 1a, 1b and 1c. First, over in sending system 100, as illustrated in FIG. 3a, at step 302, tokenizer 102 is initially employed to transform the source files from the original form to the tokenized form, with at least the language elements being substituted by corresponding tokens. Step 304 is an optional step for those embodiments where at step 302, operands are also substituted by corresponding tokens. Where applicable, tokenizer 102 further creates a symbol table, or new operand substituting token mapping entries for an existing symbol table, depending on whether the source file being processed is a first of a collection of interrelated source files or merely additional ones of the collection. Steps 302 and 304 are presented as two separate discrete steps for ease of understanding. They may be practiced as separate steps as described or as a single combined step.

Upon generating the transformed source files, sending system 100 awaits for requests for the source files, step 306. As described earlier, the requests may be made by a local requester, such as an application on sending system 100, or by a remote requester, such as an application on receiving system 140. In any event, upon receipt of a request to provide selected ones of the source files to receiving system 140, sender 106 provides requested ones of the source files in the tokenized form, reducing transmission bandwidth requirement on communication medium 180. Step 310 is also an optional step for those embodiments where at step 302, operands are also substituted by tokens, and/or the source files are being kept in base/delta form with versioning control information. Where applicable, sender 106 further provides the symbol table, update entries for the symbol table, or versioning control information, as the situation may call for. Similarly, steps 308 and 310 are presented as two discrete steps for ease of understanding. They too may be practiced as separate steps as described or as one single combined step.

Upon providing the requested ones of source files, and other applicable symbol table(s) and/or versioning control information to receiving system 140, sending system 100 returns to step 306, unless sending system 100 is to terminate operation. Steps 308–310 are repeated as many times as necessary to satisfy the various requests received by sending system 100 for receiving system 140 and the likes. Furthermore, while for ease of understanding, FIG. 3a illustrates the process of tokenizing the source files as being performed for a number of source files before requests for selected ones of the source files are received and serviced, those skill in the art will appreciate that in alternate embodiments, the process of tokenizing the source files may be dynamically performed subsequent to receiving a request for the source files instead.

Over in receiving system 140, as illustrated in FIG. 3b, at step 322, receiving system 140 either proceeds with steps 324–326 or step 328 depending on whether it is receiver 146 who has received source files provided by sending system 100 or it is de-tokenizer 144 who has received a request to restore selected ones of the tokenized source files. If it is the former, receiver 146 stores the received source files in tokenized form into library 142 as described earlier. Step 326 is an optional step for those embodiments where the operands are also substituted by tokens and/or the source files are being kept in base/delta form with versioning control information. Where applicable, receiver 146 also stores the symbol table or versioning control information into library 142 or updates the symbol table, as the situation may call for.

At step 328, de-tokenizer 144 restores the source files from the tokenized form back to the original form, restoring at least the language element substituting tokens to the corresponding tokens. For embodiments where operands are also substituted by tokens, de-tokenizer 144 further restores the operand substituting tokens to the corresponding operands, using the appropriate symbol tables.

Upon responding to the receipt of source files in tokenized form or their associated information, or responding to requests to restore selected ones of the source files, receiving system 140 returns to step 322, unless receiving system 140 is to terminate operation. Steps 324–326 and step 328 are repeated as many times as necessary to service the receipts and various requests received by receiving system 140. Furthermore, while for ease of understanding, FIG. 3b illustrates the process of restoration as being performed "on-demand", those skill in the art will appreciate that in alternate embodiments, the process of restoration may also be performed in batch prior to making the restored source files available for use on receiving system 140.

Figure 4:
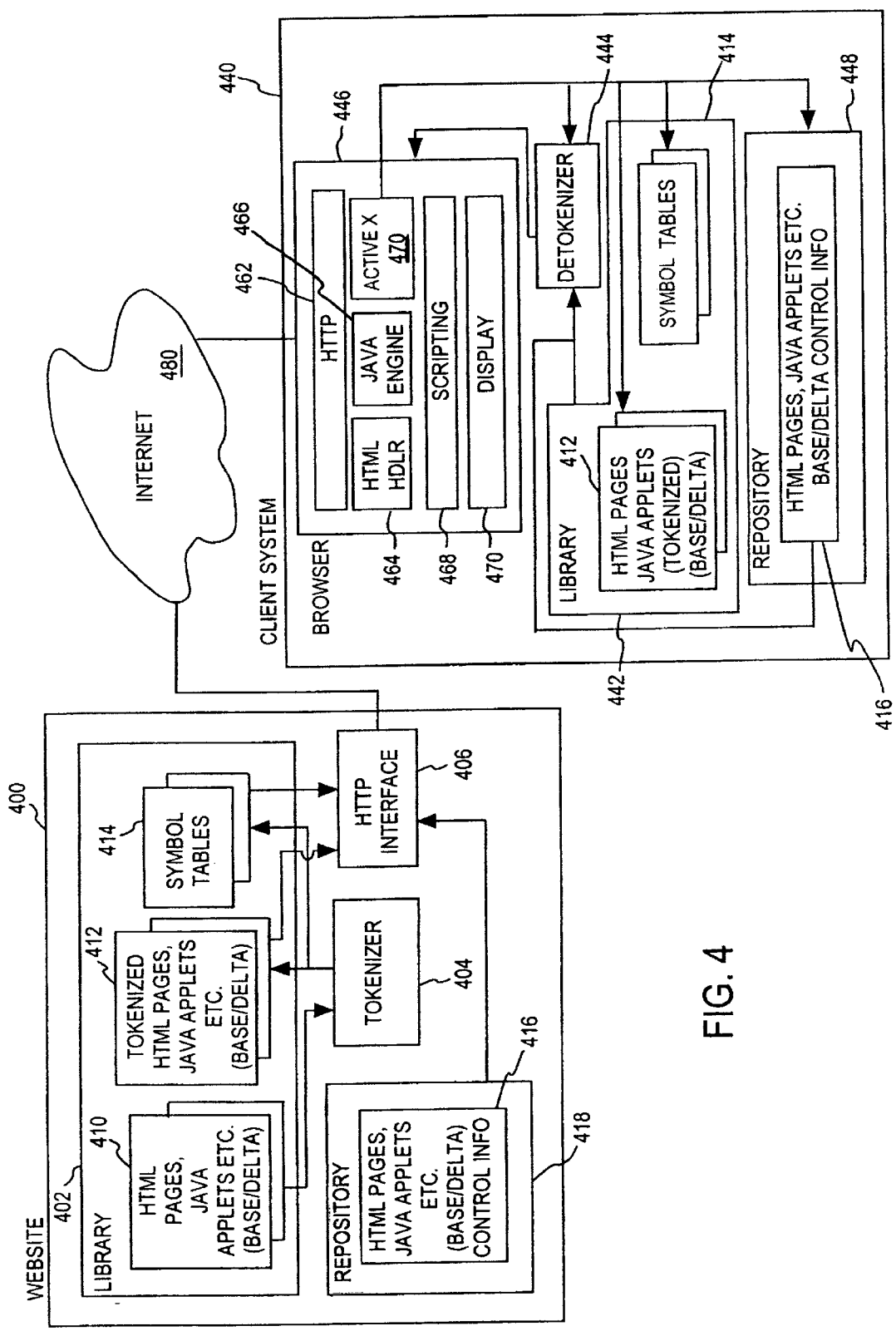
FIG. 4 illustrates one exemplary application of the present invention to web servers and client systems accessing web servers.

Referring now to FIG. 4, wherein an exemplary application of the present invention to the provision of web pages by web server is illustrated. As shown, web site 400 and an exemplary client system 440 is coupled to one another through Internet 480. Web site 400 provides web pages to client system 440 responsive to requests from client system 440. Incorporated with the teachings of the present invention, web site 400 advantageously provides the requested web pages to client system 440 in the above described tokenized form, reducing the transmission bandwidth requirement on Internet 480, which as those skilled in the art will appreciate, will also likely to result in improving perceived response time to a user of client system 440.

As described earlier for sending system 100" of FIG. 1c, web site 400 includes library 402, tokenizer 404 and HTTP interface 406 (in the role of sender 106). Library 402 is used to store HTML web pages, JAVA scripts and so forth in original as well as tokenized form 410 and 412 (hereinafter simply web page or web pages), including symbol tables 414. For the illustrated embodiment, web pages 410 and 412 are kept in base/delta form having associated versioning control information 416. However, for preferred implementation reasons, versioning control information 416 are stored in a separate repository 418 as opposed to library 402. For alternate embodiments, repository 418 may be implemented as an integral part of library 402. Tokenizer 404 and HTTP interface 406 operate as described earlier for the corresponding elements of sending system 100" to effectuate the desired reduction in bandwidth requirement on Internet 480.

Similarly, as described earlier for receiving system 140" of FIG. 1c, client system 440 includes library 442, de-tokenizer 444 and browser 446 (in the role of receiver 146). Library 442 is used to store web pages in tokenized form 412 and symbol tables 414. Also for preferred implementation reasons, versioning control information 416 are stored in a separate repository 448. Likewise, for alternate embodiments, repository 448 may also be combined with library 442.

Browser 446 includes conventional elements found in many browsers known in the art, HTTP interface 462, HTML web page handler 464, JAVA™ and JavaScript execution engine 466, other script interpreter 468 (e.g. CGI), display interface 470, and a number of "plug-ins", shown as additional Active-X components 472. Included among these Active-X components 472 is a component that interacts with library 442 and repository 448 to store received web pages 412, symbol tables 414 and versioning control information 416 in library 442 and repository 448, and selectively invoke detokenizer 414 to reconstitute and restore the web pages, as described earlier for corresponding elements of receiving system 140". Except for the teachings of the present invention incorporated in the particular Active-X component, all other elements perform their conventional functions known in the art, and their constitutions are well, accordingly, will not be further described. Additionally, those skilled in the art will also appreciate that the particular Active-X component may be provided integrally with the browser or complementarily as a supplemental function. In fact, the ability might be provided via other "extension" or "plug-in" technology. The browser may also be an integral function of an operating system having other conventional operating system functions such as a file subsystem, task scheduling and so forth.

While the above exemplary application is described in the context of the Internet and World Wide Web, those skilled in the art will appreciate that Internet 480 may be an internal private network of a corporation or an organization, with web site 400 and client system 460 being internal information servers and user computer systems respectively. Furthermore, as described in the incorporated by reference co-pending application, the provision of web pages in the above described base/delta form also has the advantage of enabling a user to selectively roll back to prior versions of the web pages. Those skilled in the art will also appreciate that for certain browsers known in the art, the described manner of provision also has the advantage of making it difficult for the unskilled users to determine the source content of the web pages.

Figure 5:
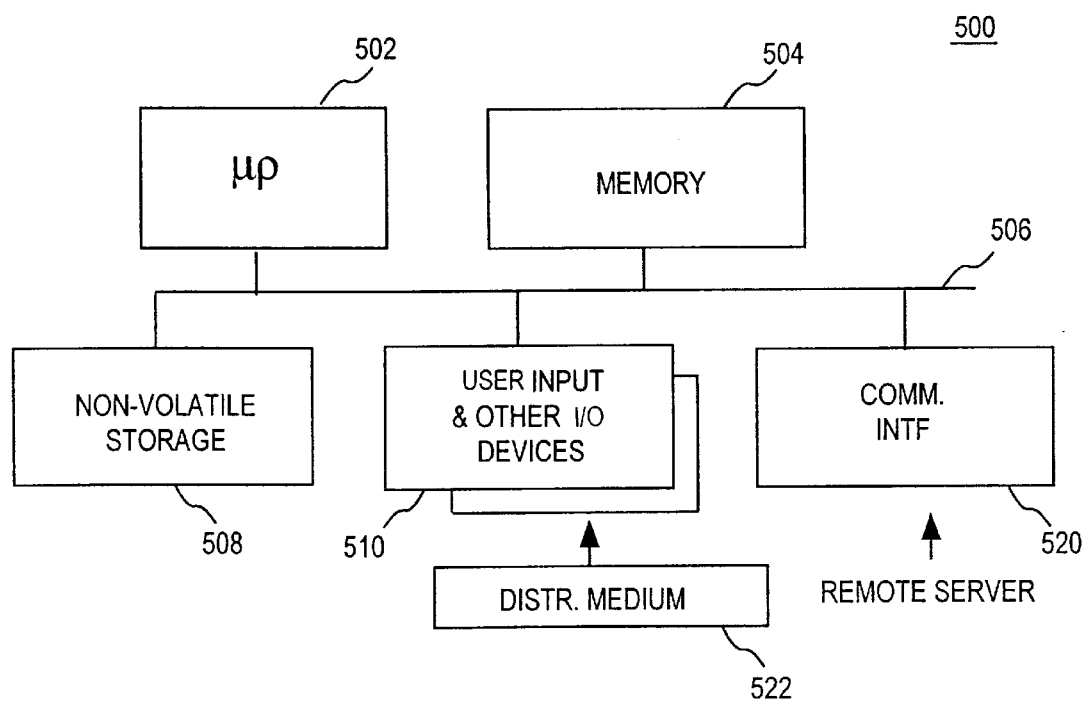
FIG. 5 illustrates one embodiment of an exemplary computer system suitable for use as either a sender or a receiver system to practice the present invention.

FIG. 5 illustrates one embodiment of an exemplary computer system suitable for use to practice the present invention, in particular as a user system. As shown, exemplary computer system 500 includes processor 502 and system memory 504 coupled to each other via system bus 506. Coupled also system bus 506 are non-volatile storage 508, various user input/output devices 510 and communication interface 520. Each of these elements perform its conventional functions known in the art. In particular, system memory 504 and non-volatile storage 508 are employed to store a working copy and a permanent copy of the programming instructions implementing the teachings of the present invention. The permanent copy of the programming instructions may be loaded into non-volatile storage 508 in the factory, or in the field, through distribution medium 522 or through communication interface 520. As described earlier, any one of a number of recordable medium such as tapes and so forth may be employed. The constitution of these elements 502–520 are also well known, and accordingly will not be further described.

Thus, a novel method and apparatus for token based source file compression/decompression and its application has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. In a vendor computer system, a computer implemented source file distribution method comprising:

transforming a plurality of source files into a tokenized form, at least some the source files being in a base and delta form having associated versioning control information for reconstitution, and the source files are to be distributed to a plurality of user computer systems including the associated versioning control information for reconstitution, and the transformation including substituting language elements present in the source files with corresponding tokens to reduce transmission bandwidth required to distribute the source files along with the version control information for reconstitution to the plurality of user computer systems; and distributing the source files along with the versioning control information for reconstitution to each of the plurality of user computer systems by transmitting the transformed source files to each of the user computer systems in said tokenized form.

2. The method of claim 1, wherein the transformation further includes substituting operands of the source files with corresponding tokens and generating a symbol table with entries mapping the operand substituting tokens to the operands, and the provision further includes transmitting the symbol table to each of the user computer systems.

3. The method of claim 1, wherein the transformation further includes substituting operands with corresponding tokens, and generating a new entry for a symbol table for each new operand encountered and substituted by a new token; and the provision further includes transmitting the new entries for the symbol table to each of the user computer systems.

4. The method of claim 1, wherein each of the base/delta source files is identified by an universally unique identifier (UUID) universally identifying the base/delta source file among source files of a plurality of vendors, and the provision of the versioning control information to the user computer systems includes transmission of predecessor UUID information of the base/delta source files.

5. In a user computer system, a computer implemented source file reception method comprising:

receiving a plurality of source files in a tokenized form along with associated versioning control information from computer systems of a plurality of vendors, at least some of the source files of said vendors being in a base and delta form with the versioning control information providing instructions on their reconstitution, and the source files being provided in the tokenized form to reduce transmission bandwidth requirement;

storing the source files of said vendors in said tokenized form, and said associated versioning control information for constitution in the user computer system; and upon request, transforming requested ones of the stored source files back to an original non-tokenized form, including restoring language element substituting tokens of the source files to corresponding language elements.

6. The method of claim 5, wherein said receiving further includes receiving from each vendor a symbol table having entries that map the vendor's operand substituting tokens to operands, and the transformation further includes restoring operand substituting tokens of the source files to corresponding operands, using corresponding ones of said received symbol tables.

7. The method of claim 5, wherein said receiving further includes receiving from the vendors' computer systems new entries mapping new operand substituting tokens to new operands for the vendors' symbol tables to which the vendors' base/delta source files are associated; and the method further includes updating the vendors' symbol tables with corresponding ones of the received new entries.

8. The method of claim 5, wherein each of the base/delta source files is identified by an universally unique identifier (UUID) universally identifying the base/delta source file among the various vendors' source files, and the receiving of the associated versioning control information from the vendors' computer systems includes receiving predecessor UUID information of the base/delta source files.

9. A distribution computer system comprising:

a tokenizer to transform a plurality of source files of a vendor into a tokenized form, at least some of the vendor s source files being in a base and delta form and having associated versioning control information providing instructions on reconstitution, and the transformation including substituting language elements present in the source files with corresponding tokens, to reduce transmission bandwidth required to provide the source files to a plurality of user computer systems; and a transmitter having access to the transformed source files to transmit the transformed source files in said tokenized form along with the associated versioning control information for reconstitution to the user computer systems.

10. The computer system of claim 9, wherein the tokenizer further substitutes operands of the vendor's source files with corresponding tokens, and generates a symbol table for the vendor with entries mapping the operand substituting tokens to the operands, and the transmitter further transmits the vendor's symbol table to the user computer systems.

11. The computer system of claim 9, wherein the tokenizer further substitutes operands with corresponding tokens, and generates a new entry for a symbol table of the vendor for each new operand encountered and substituted by a new token; and the transmitter further transmits the new entries for the vendor's symbol table to the user computer systems.

12. The computer system of claim 9, wherein each of the base/delta source files is identified by an universally unique identifier (UUID) universally identifying the base/delta source files among source files of a plurality of vendors, and the transmitter further transmits predecessor UUID information of the base/delta source files.

13. A user computer system comprising:

a receiver to receive a plurality of source files of a plurality of vendors in a tokenized form from a plurality of computer systems of the vendors, at least some of the source files being in a base and delta form, and the source files being provided with versioning control information for their reconstitution and in the tokenized form to reduce transmission bandwidth requirement;

a storage medium to store the source files of said vendors in said tokenized form; and a detokenizer, to selectively transform, upon request, requested ones of the stored source files of said vendors back to an original non-tokenized form, including restoring language element substituting tokens of the requested ones of the source files to corresponding language elements.

14. The computer system of claim 13, wherein said receiver further receives from each of said vendors a symbol table having entries that map operand substituting tokens to operands, and the de-tokenizer further restores operand substituting tokens of the requested ones of the vendors' source files to corresponding operands, using corresponding ones of said received symbol tables.

15. The computer system of claim 13, wherein
said receiver further receives from the vendors' computer systems new entries mapping new operand substituting tokens to new operands for the vendors' symbol tables to which the base/delta source files are associated, and the receiver further updates the symbol tables with corresponding ones of the received new entries.

16. The computer system of claim 13, wherein each of the base/delta source files is identified by an universally unique identifier (UUID) universally identifying the base/delta source files among source files of the plurality of vendors, and the receiver receives predecessor UUID information of the base/delta source files.

17. An article of manufacture comprising:
a recordable medium having recorded thereon a plurality of programming instructions usable to program an apparatus to enable the apparatus to be able to transform a plurality of source files into a tokenized form, at least some of the source files being in a base and delta form, and having associated versioning control information for their reconstitution, and the transformation including substituting language elements present in the source files with corresponding tokens, to reduce transmission bandwidth required to provide the source files to a plurality of user systems, and to enable the apparatus to transmit the transformed source files in said tokenized form along with the versioning control information for reconstitution to the user systems.

18. The article of claim 17, wherein the programming instructions further enable the apparatus to substitute operands of the source files with corresponding tokens, generate a symbol table with entries mapping the operand substituting tokens to the operands, and transmit the symbol table to the user systems.

19. The article of claim 17, wherein the programming instructions further enable the apparatus to substitute operands with corresponding tokens, generate a new entry for a symbol table for each new operand encountered and substituted by a new token, as well as transmit the new entries for the symbol table to the user systems.

20. An article of manufacture comprising:
a recordable medium having recorded thereon a plurality of programming instructions useable to program an apparatus to enable the apparatus to be able to receive a plurality of source files in a tokenized form from a plurality of vendor systems, at least some of the source files being in a base and delta form, having associated versioning control information for their reconstitution, and provided in the tokenized form to reduce transmission bandwidth requirement, the programming instructions further enabling the apparatus to store the source files in said tokenized form, and to transform, upon request, requested ones of the stored source files back to an original non-tokenized form, including restoring language element substituting tokens of the requested ones of the source files to corresponding language elements.

21. The article of claim 20, wherein the programming instructions further enable the apparatus to be able to receive from the vendor systems a symbol table having entries that map operand substituting tokens to operands, and to restore operand substituting tokens of the source files to corresponding operands, using corresponding ones of said received symbol tables.

22. The article of claim 20, wherein the programming instructions further enable the apparatus to receive from the vendor systems new entries mapping new operand substituting tokens to new operands for the vendors' symbol tables to which the delta source files are associated, and to update the symbol tables with corresponding received new entries.

\* \* \* \* \*